D. C. TELLER.
Grain Drill.

No. 30,433.

Patented Oct. 16, 1860.

Witnesses:
Jw Coombs
R. S. Spencer

Inventor:
D. C. Teller
per Munn & Co
attorneys

UNITED STATES PATENT OFFICE.

D. C. TELLER, OF BEAVER DAM, WISCONSIN.

IMPROVEMENT IN SOWING-MACHINES.

Specification forming part of Letters Patent No. 30,433, dated October 16, 1860.

*To all whom it may concern:*

Be it known that I, D. C. TELLER, of Beaver Dam, in the county of Dodge and State of Wisconsin, have invented a new and Improved Seed-Sower; and I do hereby declare that the following is a full, clear, and exact description of the same, reference being had to the accompanying drawings, forming a part of this specification, in which—

Figure 1:
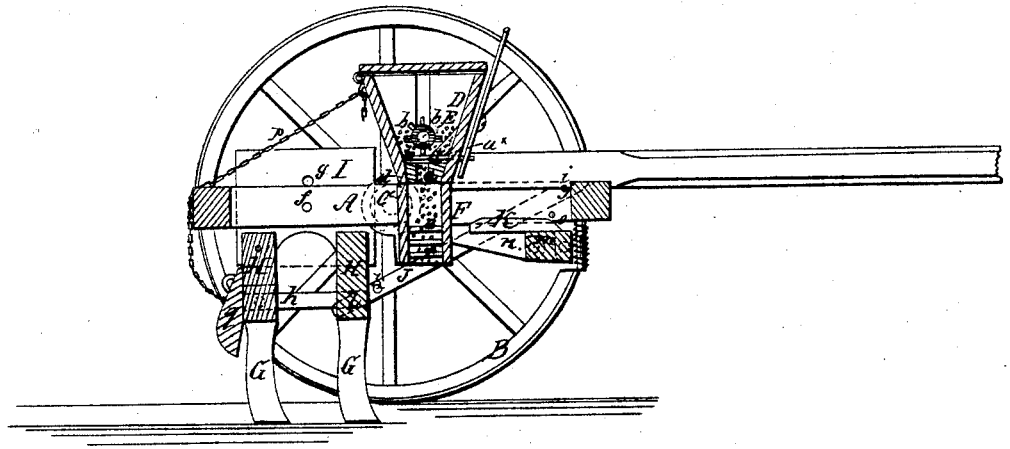
Figure 2:
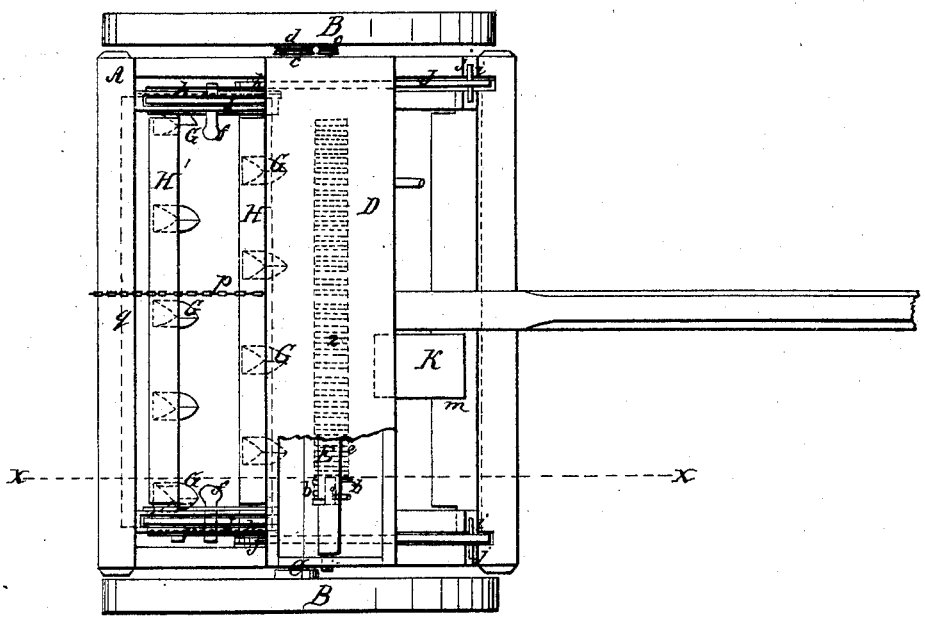

Figure 1 represents a longitudinal vertical section of this invention, the line *x x*, Fig. 2, indicating the plane of section. Fig. 2 is a plan or top view of the same.

Similar letters in both views refer to corresponding parts.

This invention relates to certain improvements in machines for sowing broadcast; and it consists in the arrangement of vertically-adjustable slides which form the bearings for a double series of swinging shares, in combination with the seed-discharging device, in such a manner that said shares can be made to cut deeper and shallower, according to the quantity and quality of seed discharged from the hopper, and that they can be made to cut at a greater or smaller inclination, according to the soil through which they have to pass.

To enable others skilled in the art to make and use my invention, I will proceed to describe its construction and operation with reference to the drawings.

The frame A is supported by the wheels B, which turn on axles C, projecting from and fastened in the sides of said frame in the usual manner. The frame A supports the hopper D, from which the seed is discharged through a series of perforations, *a*, covered and regulated by an adjustable slide, *a*\*. To prevent the seed from clogging a roller, E, extends through the entire length of the hopper, and a series of pins, *b*, are inserted into the surface of this roller. Said pins are situated close over the perforations *a* in the bottom of the hopper, and, as the roller E rotates, the pins stir up the seed and facilitate the discharge. The axle of the roller E extends through a slot in the end of the hopper, and it bears a pulley, *c*, which receives a rotary motion from a similar pulley, *d*, attached to one of the wheels B as soon as the machine begins to be drawn forward or backward. The seed is discharged from the hopper through a tube, F, which extends through the entire length of the hopper and under the same, and in order to scatter the seed a series of rods or pegs, *e*, are secured in the sides of said tube in such a manner that the same form a number of zigzag passages through which the seed in its descent from the hopper has to pass, and which serve to scatter the seed perfectly uniform and even.

For the purpose of covering up the seed a double series of shares, G, are arranged behind the discharge-tubes. These shares are secured to beams H, which run transversely across the frame and parallel with the hopper, and which turn easily in vertically-sliding plates I. These plates move up and down in slots in the side timbers of the frame, and they are adjustable in a vertical direction by means of pins *f* and holes *g*. By these means the depth to which the shares cut can be regulated.

The turning-beams H H' are connected with each other by metal strips *h*, fastened to their ends, and rods J, that are secured to the ends of the beam nearest to the hopper by means of pivots *l*, serve to retain the shares at the desired inclination. These rods are fitted up with pins *i*, which, by dropping into recesses *j* on the top edge of the frame A, form stops to prevent the shares moving spontaneously. These recesses are rounded off toward the front, and they are provided with a square shoulder toward the rear, so that in backing the stops *i* are allowed to slip out of said recesses, thereby preventing an injury to the shares; but in going forward the stops *i* are retained by the square shoulders on the inside of the recesses *j*, and the shares are rendered rigid. By increasing or decreasing the length of the rods J between the stops *i* and the pivots *l*, which secure them to the end of one of the beams H, the inclination of the shares can be regulated. In order to effect this with facility, the rods J are provided with two or more holes, *k*, to admit of changing the position of the pivots *l*.

If it is desired to release the shares while the machine is going forward, a treadle, K, is arranged in front of the hopper. This treadle is secured to a rock-shaft, *m*, that has its bearings in lugs *n* at the under side of the frame A, and it connects with dogs *o*, which pass up through the side timbers of the frame, and which act on the rods J, so that on depressing the treadle said rods are raised, and both stops are lifted clear of the recesses $j$, thus allowing the shares to turn up and to pass over obstructions without damage. The treadle K is so situated that it can conveniently be reached from the cover of the hopper, which at the same time forms the driver's seat.

In drawing the machine from the barn to the field or from one field to another the shares are turned up and suspended from a chain, $p$, which is secured to the rear side of the hopper. A projection, $q$, which extends down from the beam H' behind the shares, serves to strengthen this beam.

This machine is very simple and durable, and it can easily be understood and operated. All its parts are so constructed that they do not easily get out of order.

Having thus fully described my invention, what I claim as new, and desire to secure by Letters Patent, is—

The arrangement of the vertically-sliding plates I and turning-beams H, from which the shares are suspended, in combination with the hopper D and discharge-tube F', constructed and operating substantially as and for the purpose herein set forth.

D. C. TELLER.

Witnesses:
G. K. ROBINSON,
H. B. PHELPS.